May 20, 1941.　　　A. S. WELDY　　　2,242,603
LIQUID LEVEL GAUGE
Filed June 3, 1939　　　2 Sheets-Sheet 1
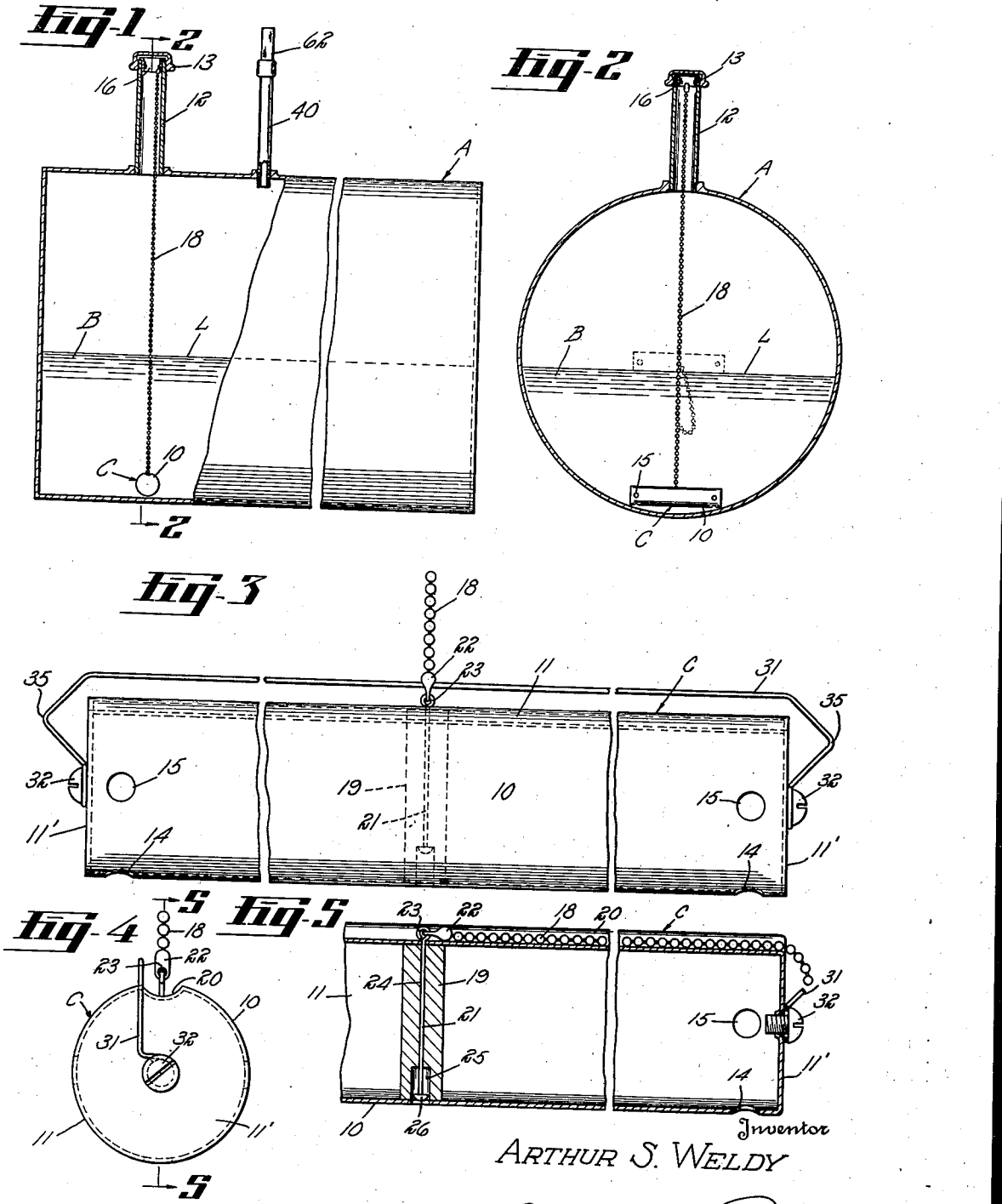
Inventor
ARTHUR S. WELDY
Attorneys May 20, 1941.  A. S. WELDY  2,242,603
LIQUID LEVEL GAUGE
Filed June 3, 1939  2 Sheets-Sheet 2
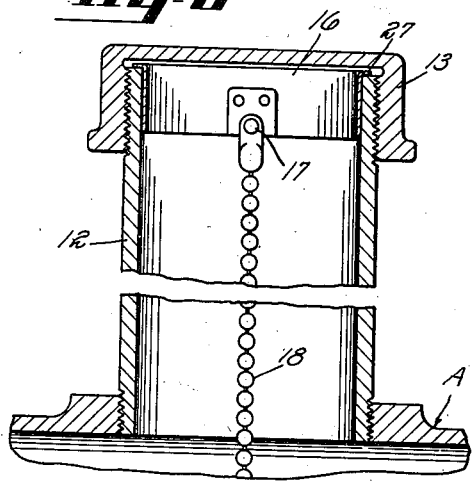
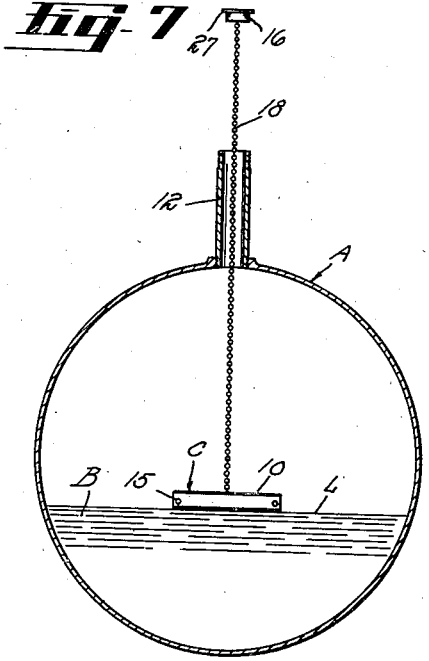
Inventor
ARTHUR S. WELDY
By Lindsey & Robillard
Attorneys Patented May 20, 1941

2,242,603

UNITED STATES PATENT OFFICE 2,242,603

LIQUID LEVEL GAUGE

Arthur S. Weldy, Hartford, Conn.

Application June 3, 1939, Serial No. 277,271

6 Claims. (Cl. 73—305)

This invention relates to a liquid level gauge, and more particularly to a device which is adapted to gauge the liquid level in a storage or supply tank.

The object of the present invention is to provide a simple and highly efficient improved means for determining the liquid level in a supply or storage tank, said means being manually operated and located in a predetermined location to be always accessible for ready manipulation.

A further object of this invention is to provide a liquid level gauge which may be readily installed in the supply tank for which it is intended or may be readily installed in most of the tanks now being used.

A further object of this invention is to provide means for easily retrieving elements of the liquid level indicating mechanism from the supply tank if said elements become misplaced therein through failure of one of said elements.

With these and other objects in view, this invention resides in the unique construction and the combination of members hereinafter fully described, illustrated in the accompanying drawings and referred to in the claims appended hereto; it being understood, of course, that various changes in the general form, proportion, size and arrangement of elements, as well as other minor details of construction lying within the scope of the claims may be resorted to without departing from the spirit of the invention or sacrificing any of the advantages thereof.

In the accompanying drawings wherein like parts are indicated by like reference numerals;

Figure 1 is a side elevation of the supply tank, partially in section, showing the normal position of the liquid level indicating mechanism;

Fig. 2 is an end elevation in section of the supply tank, taken substantially along the line 2—2 of Figure 1;

Fig. 3 is a side elevation of the float element of the indicating device drawn to a much larger scale than Figs. 1 and 2;

Fig. 4 is an end elevation of Fig. 3;

Fig. 5 shows a portion of Fig. 3 in section taken substantially along line 5—5 of Fig. 4 but showing the operating means in another position;

Fig. 6 is a sectioned side elevation of the inlet connection to the supply tank showing the level gauge positioning means;

Fig. 7 is another end elevation of the tank, in section, showing the level gauge in its operating position indicating the level of the liquid;

Referring to the drawings, there is shown generally a supply or storage tank A adapted to hold a supply of liquid B such, for example, as fuel oil, there being arranged within the tank, indicating means C for determining the level of the liquid therein.

More specifically, the tank A is of the type commonly used in conjunction with domestic oil burners and may be of any suitable construction and permanent shape, thus having a known capacity. The tank A has the usual upwardly extending filling pipe 12 adapted to be closed by a removable cap 13, and is further provided with an upwardly extending air vent 40. Inasmuch as the tank A is of known capacity the level L of any liquid B contained therein will indicate the volume thereof, subject to such minor variations as may occur due to temperature changes, which changes, for all practical purposes, may be disregarded.

In accordance with the invention herein the liquid level indicating means C includes a suitable hollow member 10 connected at its center of balance to the lower end of a flexible chain 18 adapted to be manually operated for raising and lowering the member 10. The chain 18 has its upper end swivelly connected at 17 to a sleeve 16 having an outer diameter equal to the inner diameter of the filling pipe 12 and also having the outer end thereof flanged outwardly at 27 to properly position the sleeve within the upper end of the filling pipe 12. As best indicated in Fig. 1 the length of the chain 18 is such that when the collar 16 is positioned in the stand pipe the member 10 is at its lowermost position in the tank A.

The hollow member 10 is of such specific gravity that it would ordinarily float upon the surface of the liquid within the tank, however, in order to prevent fouling of chain 18, or to properly dispose of such other control means as may be utilized therewith, the member 10 is provided with means for allowing a slow leakage of the liquid into same to increase its specific gravity and cause it to sink.

Although the member 10 could be of various constructions, it is preferably made out of sheet metal shaped to provide an elongated metal tube 11 closed at its opposite ends by suitable closures 11' secured to the tube as by seam welding. The means for permitting a slow leakage of liquid therein comprises a plurality of openings 14 and 15 circumferentially spaced around the tube 11 adjacent the ends thereof. As indicated, the openings 15 are normally in the central horizontal plane of the member 10 whereas the openings 14 are 90 degrees therefrom and in the central vertical plane thereof. With this construction, when the member 10 is lowered to freely float on the liquid, the liquid will enter the cylinder through the openings 14 and the air escape through the opening 15, resulting in a change in the specific gravity thereof and cause it to sink. If, on the other hand, the collar 16 at the end of the chain 18 has been replaced within the filling pipe 12, the chain 18 will cause the member 10 to capsize, whereupon the liquid will now enter the openings 15 and the air escape through the openings 14. Thus, it is apparent that the openings are so positioned that regardless of the position of the member 10, when unsupported by the chain 18, the liquid will flow into same and cause it to sink below the level of the liquid B.

With the foregoing construction, if one wishes to determine the amount of liquid within the tank A the collar 16 is withdrawn from the standpipe until the member 10 is above the level of the liquid B, its release from the liquid as it breaks the surface thereof being very evident to the person manipulating same. The member 10 will then be held above the liquid level until fully drained, and thereafter lowered onto the surface L. As the leakage of liquid into member 10 is relatively slow the person manipulating same may definitely ascertain the liquid level and thereby determine the volume of liquid still remaining in the tank. After this has been determined, the collar 16 may again be replaced, whereupon the member 10 will sink below the liquid. Obviously, by properly graduating the chain 18, or such other means as are utilized for supporting the member 10, the person manipulating same may directly read from the chain the amount of liquid within the tank. To assure substantially even drainage, the member 10 may also be provided with a centrally arranged rigid interior partition 19, thereby normally retaining it in a level position when suspended clear of the liquid B.

A further feature of the invention herein is the construction of the indicating means C whereby it may be readily inserted into the tank after the tank has been assembled or it may be inserted into tanks already in use. To accomplish this, the member 10 is provided with a longitudinally extending groove 20 of such depth that the chain 18 may lie within same and thereby permit the member to be inserted endwise through a filling pipe 12 of approximately like diameter thereto. In order to readily position the chain 18 within the groove 20, the lower end thereof terminates in a link 22 adapted to be received within a loop 23 on the upper end of an anchoring pin 21, and thus provide, in effect, a swivel connection therebetween. The anchor pin 21 is positioned midway between the ends of the member 10 and centrally of the groove 20, thus locating it in the center of balance thereof. As best seen in Fig. 4, the anchor pin extends through and is rotatable in a reduced bore 24 arranged in the center partition 19 of the member 10 and the lower end of the pin extends within an enlarged bore 25 axially aligned with bore 24 and secured therein by heading over the end thereof as at 26. Preferably, the pin 21 is of greater length than the bore 24 to provide lost motion therebetween and allow the swivel connection between the chain 18 and the anchor pin 21 to be positioned in the groove 20 for installing purposes and to move out of the groove and thereby increase the balance of the member 10 when suspended by chain 18.

To retrieve member 10 should it become disconnected from the chain 18, there is provided thereon a grappling hook guide wire 31 provided at its opposite ends with depending legs 35 secured as by screws 32 to the end closures 11', the legs being of such length that the wire 31 is spaced outwardly from member 10 and parallel thereto. The legs 35 are preferably bent to V form with the base of the V spaced outwardly from the end closure, whereupon if a grappling hook is caught under the wire 31 and slid along same, it will eventually catch in the apex of the V and suspend the member 10 in vertical position to permit its ready withdrawal from the tank. To further facilitate the withdrawal, the wire 31 is made of a suitable flexible material and arranged in substantial alignment with the groove 20 allowing it to be forced into same as the member 10 is withdrawn through the filling pipe.

As previously indicated the tank A may also be provided with a suitable vent 40 and, in accordance with the disclosure herein, there is associated therewith means 62 for indicating when the tank has been completely filled.

Obviously in manufacturing the indicating means the metal parts thereof should all be made of the same metal in order to reduce the possibility of galvanic action therebetween.

Although the oil tank A has been shown with a vertically arranged stand pipe, it is quite apparent that when a flexible chain is used for the manipulation of the member 10, the standpipe A may be curved or have elbows therein, as is quite common when the oil tank is installed within a house and accessible from outside the house.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination with a tank for holding liquid, a liquid level gauge comprising a hollow cylindrical member having closed ends and a normal specific gravity less than the liquid contained within the tank, whereby said member will float on the surface of the liquid contained therein, said member being provided with relatively small openings whereby it will gradually fill and sink, and manually operable means for raising and lowering the member.

2. In combination with a tank for holding liquid a liquid level gauge comprising a substantially closed, hollow elongated member having a normal specific gravity less than the liquid contained in the tank, manually operable means for raising and lowering said member, means connecting said member to said manually operable means whereby said member will be suspended in a horizontal position, said hollow member being provided with peripherally spaced openings whereby said member will fill with liquid and sink below the level thereof.

3. In combination with a tank for holding liquid and provided with a filling pipe, a liquid level gauge comprising a hollow member having a normal specific gravity less than the liquid contained within the tank, whereby said member will float on the surface thereof, a collar adapted to fit within said filling pipe and having a flared-over end for positioning it on the outer end of said filling pipe, and a chain for raising and lowering said member and having its opposite ends connected to said collar and member.

4. A liquid level gauge comprising a substantially closed, hollow elongated member adapted to normally float on the surface of a liquid, manually operable means for raising and lowering said member and connected thereto to suspend the member in a substantially horizontal position, said hollow member being provided with means for causing it to automatically fill with liquid and sink below the level thereof and to allow the liquid to drain therefrom when raised above the level thereof.

5. A liquid level gauge comprising a substantially closed, hollow elongated member adapted to normally float on the surface of a liquid, manually operable means for raising and lowering said member and connected thereto to suspend the member in a substantially horizontal position, said hollow member being provided with spaced openings whereby said member will automatically fill with the liquid and sink below the surface thereof.

6. In combination with a tank for holding liquid and provided with a filling pipe, a liquid level gauge comprising a hollow member having a normal specific gravity less than the liquid contained within the tank, whereby said member will float on the surface thereof, said hollow member being provided with means for causing it to automatically fill with liquid and sink below the surface thereof, a chain for raising and lowering said member and having one end connected to said member to suspend it in a substantially horizontal position, and a restraining member secured to the other end of the chain and receivable within the mouth of the filling pipe.

ARTHUR S. WELDY.